Feb. 1, 1938.  F. L. ALBEN  2,106,823
FLEXIBLE DRIVE
Filed July 8, 1936
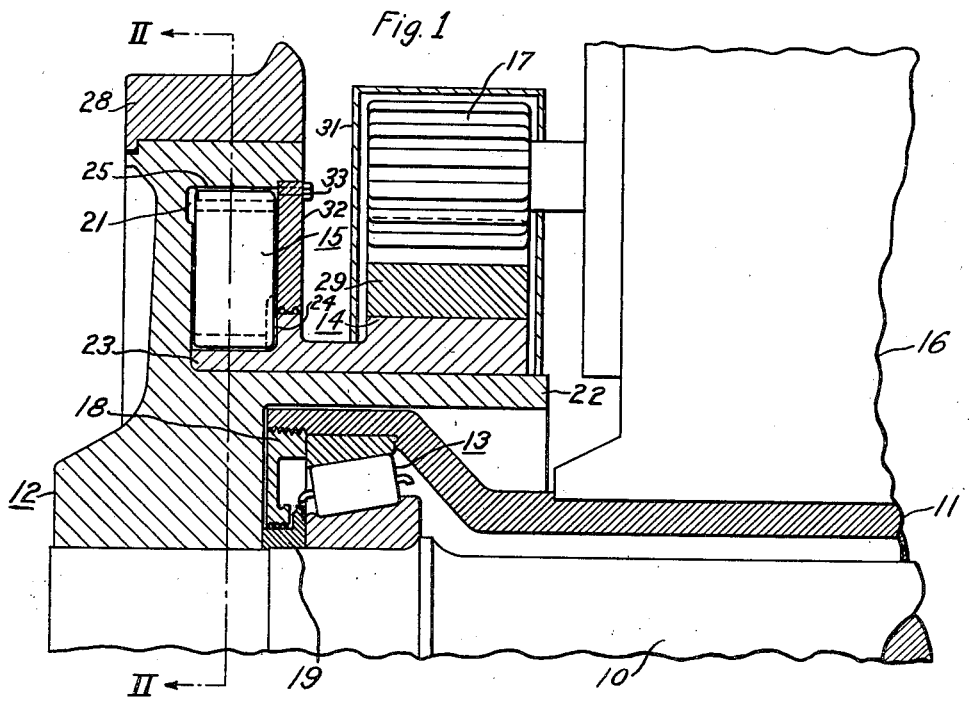
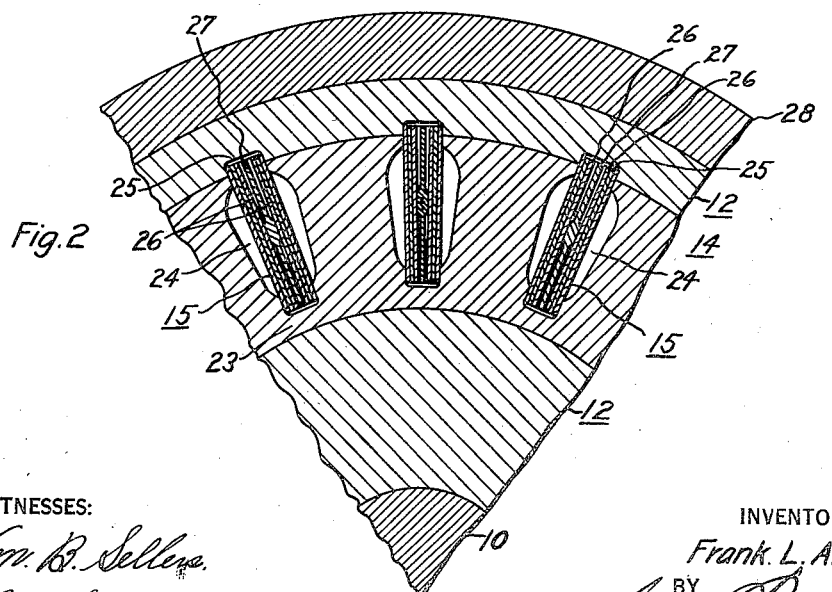
WITNESSES:
INVENTOR
Frank L. Alben.

Patented Feb. 1, 1938

2,106,823

UNITED STATES PATENT OFFICE 2,106,823

FLEXIBLE DRIVE

Frank L. Alben, Pittsburgh, Pa., assignor to Westinghouse Electric & Manufacturing Company, East Pittsburgh, Pa., a corporation of Pennsylvania Application July 8, 1936, Serial No. 89,572

4 Claims. (Cl. 105—131)

My invention relates, generally, to driving mechanisms and, more particularly, to flexible driving mechanisms utilized in connection with electrically-propelled vehicles and the like.

An object of my invention, generally stated, is to provide an improved flexible driving mechanism which shall be simple and efficient in operation and which may be economically manufactured and installed.

A more specific object of my invention is to provide a flexible driving mechanism of a compact structure that is suitable for use in vehicle structures provided with roller axle bearings wherein only a limited amount of space is available for the driving mechanism.

Another object of my invention is to provide for properly lubricating the members of a flexible driving mechanism.

Other objects of the invention will be either explained fully hereinafter or will be apparent to those skilled in the art.

According to one embodiment of the invention the flexible members of a driving mechanism are enclosed in the vehicle wheel center which supports a spider or gear center to which a gear rim is secured, the driving torque being transmitted from the gear through the spider and the flexible members to the wheel, thereby permitting sufficient movement between the wheel and the gear to provide the desired flexibility. The wheel center is secured to the axle which rotates in a roller bearing enclosed in the axle housing which supports the driving motor.

For a fuller understanding of the nature and objects of the invention reference may be had to the following detailed description, taken in conjunction with the accompanying drawing, in which:

Figure 1 is a view, partially in section and partially in elevation, of a flexible driving mechanism embodying my invention, and, Fig. 2 is a view, in section, taken along the line II—II of Fig. 1.

Referring now to the drawing, the flexible driving mechanism comprises an axle 10 disposed in a housing 11, a wheel 12 which may be pressed upon the axle and secured thereto in the usual manner, a roller bearing 13 for supporting the housing on the axle, a gear member 14, a plurality of flexible spring elements 15 for transmitting torque between the gear and the wheel, and a motor 16 mounted upon the housing 11 and having a pinion 17 for driving the gear 14.

As shown in Fig. 1, the end of the housing 11 is enlarged to contain the roller bearing 13, which may be of a type well known in the art. The bearing 13 may be secured in position by an adjustable bearing cap 18 threaded into the housing 11. An oil ring 19 is pressed onto the axle 10 and cooperates with the bearing cap 18 to retain a lubricant within the housing 11 for lubricating the bearing members.

In previously known flexible driving mechanisms the flexible elements have been incorporated in the gear members to permit limited movement between the gear center and the gear rim, thereby affording the desired flexibility in the mechanism. However, in certain driving mechanisms for electric railway vehicles, particularly when the axle bearings are of the roller type, the utilization of flexible gear elements becomes impossible because of the limited space available for the gearing mechanism. In the present structure, embodying my invention, the flexible spring elements are disposed in the wheel structure in a manner to afford the required flexibility in the driving mechanism and permit the use in a limited space of roller axle bearings and gear members of the proper size to provide the desired gear ratio.

In order to secure flexibility in the driving mechanism, the wheel 12 is provided with an annular recess 21 and an extended portion 22, which overlap the enlarged portion of the housing 11, on which the gear center or spider 14 is rotatably mounted. The gear center 14 is provided with an annular flange 23 which is disposed in the recess 21 in the wheel 12 and contains a plurality of relatively deep slots 24, disposed in its periphery to register with relatively shallow slots 25 in the wheel 12 at the periphery of the recess 21.

As shown, a flexible spring element 15 is disposed in each one of the slots 24 to engage the wheel 12, thereby flexibly transmitting torque from the gear to the wheel. The spring elements 15 may be of a type which comprise several pairs of leaf springs 26 with the adjacent ends of each pair in spaced relation. The innermost pair of spring leaves is separated by a spacing member 27 which engages the spring leaves at their midpoint. One end of each of the leaves is so disposed in one of the slots 25 in the wheel 12 that the outermost pair of leaves engages the edges of the slots. The other ends of the leaves are disposed in the bottom of the slots 24 in the flange 23 of the spider 14. However, it will be understood that any suitable spring element may be utilized to provide the desired flexibility in the driving mechanism.

It will be noted that the present construction permits the wheel 12 to be provided with a removable tire or rim 28 which may be replaced when necessary. Likewise, the spider or gear center 14 has a separate rim 29 provided with teeth which mesh with the pinion 17, driven by the motor 16. The gear 14 and pinion 17 are enclosed by a gear case 31 of the usual type.

In order that proper lubrication of the spring members 15 will be insured, an annular plate 32 is provided for enclosing the spring elements in the recess 21. The plate 32 may be secured in position by means of stud bolts 33 in the wheel 12 or in any other suitable manner. Thus, a lubricant may be sealed in with the spring members to provide for their proper lubrication and dirt is excluded by the plate 32, thereby ensuring a long life of the spring members.

It will be noted that the present device will flexibly transmit torque in either direction. Thus, when the pinion 17 is driven in either direction the spider or gear 14 moves rotatively on the wheel 12 to bend the spring leaves 26 until the ends of the innermost pair of each element engage the spacing member 27 whereupon movement between the gear and the wheel is stopped by the ends of the springs engaging the edges of the slots 25 and the wheel rotates with the gear 14.

From the foregoing description it is apparent that I have provided a flexible driving mechanism which is simple and compact in structure and which is particularly adapted for use on electric railway vehicles having axle bearings of the roller type where only a limited amount of space is available for the gear members.

Since many modifications may be made in the apparatus and arrangement of parts without departing from the spirit of my invention, I do not wish to be limited other than by the scope of the appended claims.

I claim as my invention:

1. In a flexible driving mechanism, in combination, an axle, an axle housing, a roller bearing for supporting the housing on the axle, said housing having an enlarged portion for containing the bearing, a wheel center secured to the axle, said wheel center having an annular recess disposed therein and an extended portion overlapping the enlarged portion of said housing, a gear rotatably mounted on the extended portion of the wheel center, said gear having an annular flange disposed within the annular recess in the wheel center and a plurality of slots in said flange, and a plurality of flexible spring members disposed in said slots to engage the wheel center to flexibly transmit torque between the gear and the wheel center.

2. In a flexible driving mechanism, in combination, an axle, an axle housing, a roller bearing for supporting the housing on the axle, said housing having an enlarged portion for containing the bearing, a wheel center secured to the axle, said wheel center having an annular recess disposed therein and an extended portion overlapping the enlarged portion of said housing, a gear rotatably mounted on the extended portion of the wheel, said gear having an annular flange disposed within the annular recess in the wheel and a plurality of slots in said flange, a plurality of flexible spring members disposed in said slots to engage the wheel center to flexibly transmit torque between the gear and the wheel center, and an annular cover plate detachably secured to the wheel center for enclosing the spring members in said slots to retain a lubricant therein.

3. In a flexible driving mechanism, in combination, an axle, an axle housing, a roller bearing for supporting the housing on the axle, said housing having an enlarged portion for containing the bearing, a wheel center secured to the axle, said wheel center having an annular recess disposed therein with a plurality of relatively shallow slots in the wheel center at the periphery of said recess, an extended portion on said wheel center overlapping the enlarged portion of said housing, a gear rotatably mounted on the extended portion of the wheel center, said gear having an annular flange disposed within the recess in the wheel center and a plurality of relatively deep slots in the periphery of the flange disposed to register with the slots in the wheel center, and a plurality of spring leaves having their ends disposed in said slots to flexibly transmit torque between the gear and the wheel center.

4. In a flexible driving mechanism, in combination, an axle, an axle housing, a roller bearing for supporting the housing on the axle, said housing having an enlarged portion for containing the bearing, a wheel center secured to the axle, said wheel center having an annular recess disposed therein with a plurality of relatively shallow slots in the wheel center at the periphery of said recess, an extended portion on said wheel center overlapping the enlarged portion of said housing, a gear rotatably mounted on the extended portion of the wheel center, said gear having an annular flange disposed within the recess in the wheel center and a plurality of relatively deep slots in the periphery of the flange disposed to register with the slots in the wheel center, a plurality of spring leaves having their ends disposed in said slots to flexibly transmit torque between the gear and the wheel center, and a motor mounted on said housing for driving said gear.

FRANK L. ALBEN.